US012525702B2

(12) United States Patent
Yoo et al.

(10) Patent No.: US 12,525,702 B2
(45) Date of Patent: Jan. 13, 2026

(54) ANTENNA AND ELECTRONIC APPARATUS INCLUDING SAME

(71) Applicant: Samsung Electronics Co., Ltd., Suwon-si (KR)

(72) Inventors: Jangsun Yoo, Suwon-si (KR); Jongmyung Kim, Suwon-si (KR); Moonhee Lee, Suwon-si (KR); Yongjoo Shin, Suwon-si (KR); Myeonggil Lee, Suwon-si (KR); Gun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 18/790,317

(22) Filed: Jul. 31, 2024

(65) Prior Publication Data

US 2024/0387977 A1 Nov. 21, 2024

Related U.S. Application Data

(63) Continuation of application No. PCT/KR2023/002266, filed on Feb. 16, 2023.

(30) Foreign Application Priority Data

Feb. 24, 2022 (KR) ........................ 10-2022-0024148
May 10, 2022 (KR) ........................ 10-2022-0056975

(51) Int. Cl.
*H01Q 1/22* (2006.01)
*H01Q 1/24* (2006.01)
(Continued)

(52) U.S. Cl.
CPC ............. *H01Q 1/2266* (2013.01); *H01Q 1/50* (2013.01); *H01Q 5/307* (2015.01)

(58) Field of Classification Search
CPC ........ H01Q 1/2266; H01Q 1/243; H01Q 1/50; H01Q 5/307; H01Q 9/42; H01Q 21/28
See application file for complete search history.

(56) References Cited

U.S. PATENT DOCUMENTS 10,938,113 B1 3/2021 Kim et al.
2010/0289704 A1 11/2010 Yang et al.
(Continued)

FOREIGN PATENT DOCUMENTS

JP 6923836 B1 8/2021
KR 10-2009-0126001 A 12/2009
(Continued)

OTHER PUBLICATIONS

Extended European Search Report dated Apr. 3, 2025, issued in a European Application No. 23760325.3.
(Continued)

*Primary Examiner* — Hoang V Nguyen
(74) *Attorney, Agent, or Firm* — Jefferson IP Law, LLP

(57) ABSTRACT

An electronic apparatus is provided. The electronic apparatus includes a housing including a first portion and a second portion different from the first portion, a keyboard disposed in the first portion of the housing, a palm rest disposed in the second portion of the housing and a rest area, and an antenna disposed inside the housing so as to overlap the palm rest. The antenna includes a feed pattern disposed in a rest area away from the keyboard, the feed pattern including a first ground area connected to the housing, and a feed area connected to the first ground area, a grip sensing pattern disposed in the rest area adjacent to the keyboard, the grip sensing pattern including a second ground area connected to the housing and a coupling area connected to the second ground area and configured to be coupled to the feed area.

17 Claims, 15 Drawing Sheets

(51) Int. Cl.
*H01Q 1/50* (2006.01)
*H01Q 5/307* (2015.01)

(56) References Cited

U.S. PATENT DOCUMENTS

| | | | | |
|---|---|---|---|---|
| 2015/0084816 | A1* | 3/2015 | Kurose | H01Q 1/526 343/702 |
| 2020/0389845 | A1 | 12/2020 | Hawaka et al. | |
| 2021/0028533 | A1 | 1/2021 | Liao et al. | |
| 2021/0111481 | A1 | 4/2021 | Thakur et al. | |
| 2021/0242567 | A1 | 8/2021 | Wang et al. | |
| 2023/0216187 | A1 | 7/2023 | Yoo et al. | |

FOREIGN PATENT DOCUMENTS

| | | | |
|---|---|---|---|
| KR | 10-2013-0072767 | A | 7/2013 |
| KR | 10-2017-0071200 | A | 6/2017 |
| KR | 10-2021-0030739 | A | 3/2021 |
| KR | 10-2021-0050352 | A | 5/2021 |

OTHER PUBLICATIONS

International Search Report dated May 22, 2023, issued in International Patent Application No. PCT/KR2023/002266.

* cited by examiner

ANTENNA AND ELECTRONIC APPARATUS INCLUDING SAME

CROSS-REFERENCE TO RELATED APPLICATION(S)

This application is a continuation application, claiming priority under § 365 (c), of an International application No. PCT/KR2023/002266, filed on Feb. 16, 2023, which is based on and claims the benefit of a Korean patent application number 10-2022-0024148, filed on Feb. 24, 2022, in the Korean Intellectual Property Office, and of a Korean patent application number 10-2022-0056975, filed on May 10, 2022, in the Korean Intellectual Property Office, the disclosure of each of which is incorporated by reference herein in its entirety.

BACKGROUND

1. Field

The disclosure relates to an antenna and an electronic device including the antenna.

2. Description of Related Art

The use of electronic devices having wireless communication functions, such as data communication (e.g., the Internet), has increased. Various technologies to utilize a next-generation network (e.g., fifth generation new radio (5G NR)) have been developed to provide a high-speed mobile communication function to a user. The above description is information the inventor(s) acquired during the course of conceiving the disclosure, or already possessed at the time, and is not necessarily art publicly known before the application was filed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna and electronic apparatus including same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first portion and a second portion different from the first portion, a keyboard disposed in the first portion of the housing, a palm rest disposed in the second portion of the housing and including a plurality of rest areas, and an antenna disposed in the housing to overlap the palm rest, the antenna including a feed pattern disposed in the rest area away from the keyboard among the plurality of rest areas, the feed pattern including a first ground area connected to the housing, and a feed area connected to the first ground area, and a grip sensing pattern disposed in the rest area adjacent to the keyboard among the plurality of rest areas, the grip sensing pattern including a second ground area connected to the housing, and a coupling area connected to the second ground area and configured to be coupled to the feed area.

In accordance with another aspect of the disclosure, an electronic device is provided. The electronic device includes a housing including a first portion and a second portion different from the first portion, a keyboard disposed in the first portion of the housing, a palm rest disposed in the second portion of the housing and including a plurality of rest areas, and an antenna disposed in the housing to overlap the palm rest, a first antenna configured to operate in a first frequency band, disposed in the housing to overlap the palm rest, and including a feed pattern disposed in the rest area away from the keyboard among the plurality of rest areas, and including a first ground area connected to the housing, and a feed area connected to the first ground area, and a grip sensing pattern disposed in the rest area adjacent to the keyboard among the plurality of rest areas, and including a second ground area connected to the housing, and a coupling area connected to the second ground area and configured to be coupled to the feed area, and a second antenna configured to operate in a second frequency band different from the first frequency band and disposed in the housing to be coupled with the grip sensing pattern.

In accordance with another aspect of the disclosure, an antenna is provided. The antenna includes a feed pattern including a first ground area, and a feed area connected to the first ground area, and a grip sensing pattern including a second ground area, and a coupling area connected to the second ground area and configured to be coupled with the feed area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
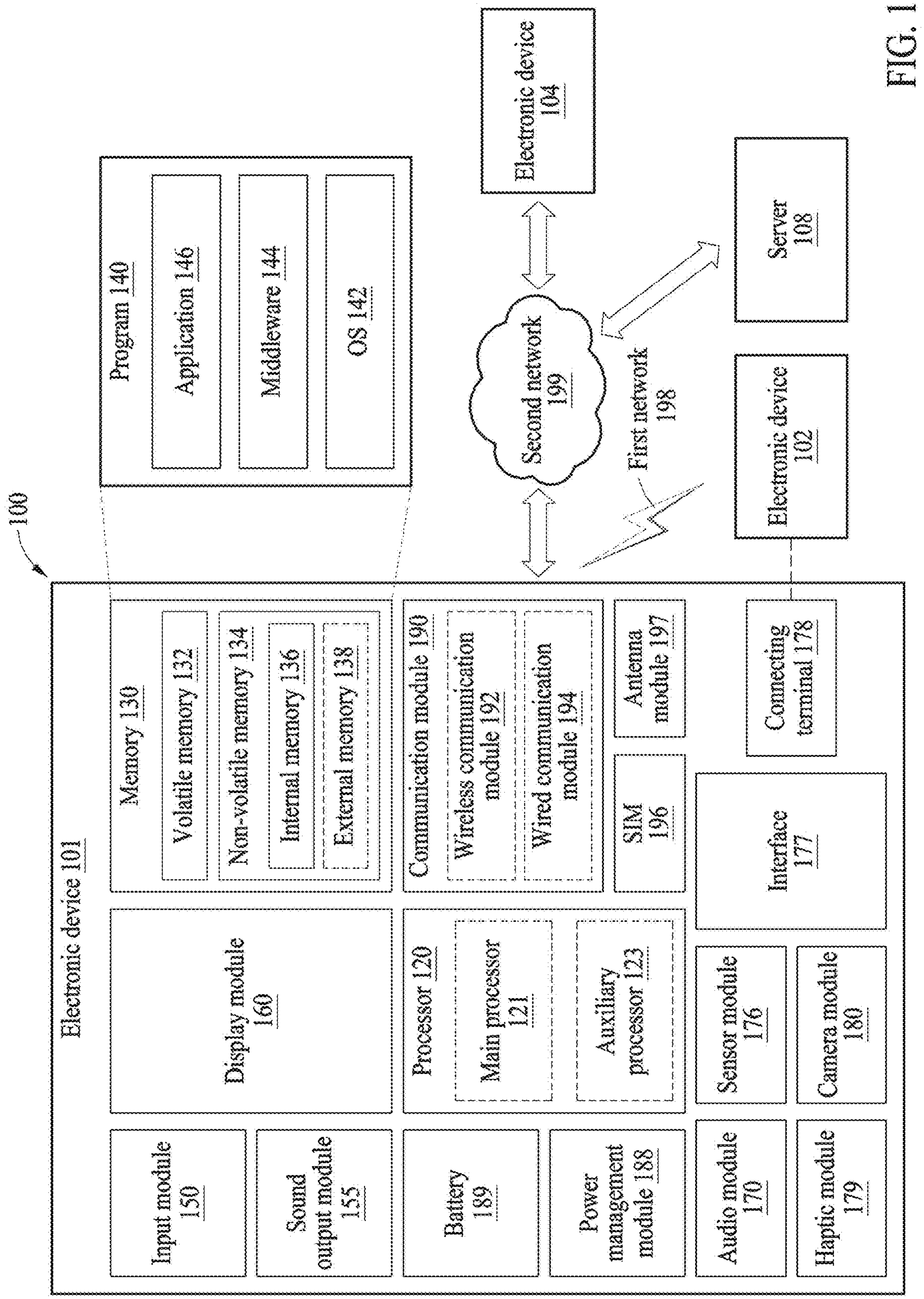
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. The AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, or the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth-generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least a portion of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to the embodiments disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. As used herein, “A or B,” “at least one of A and B,” “at least one of A or B,” “A, B or C,” “at least one of A, B and C,” and “at least one of A, B, or C,” may include any one of the items listed together in the corresponding one of the phrases, or all possible combinations thereof. Terms such as “$1^{st}$,” and “$2^{nd}$,” or “first” or “second” may simply be used to distinguish the component from other components in question, and do not limit the components in other aspects (e.g., importance or order). It is to be understood that if an element (e.g., a first element) is referred to, with or without the term “operatively” or “communicatively,” as “coupled with,” “coupled to,” “connected with,” or “connected to” another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
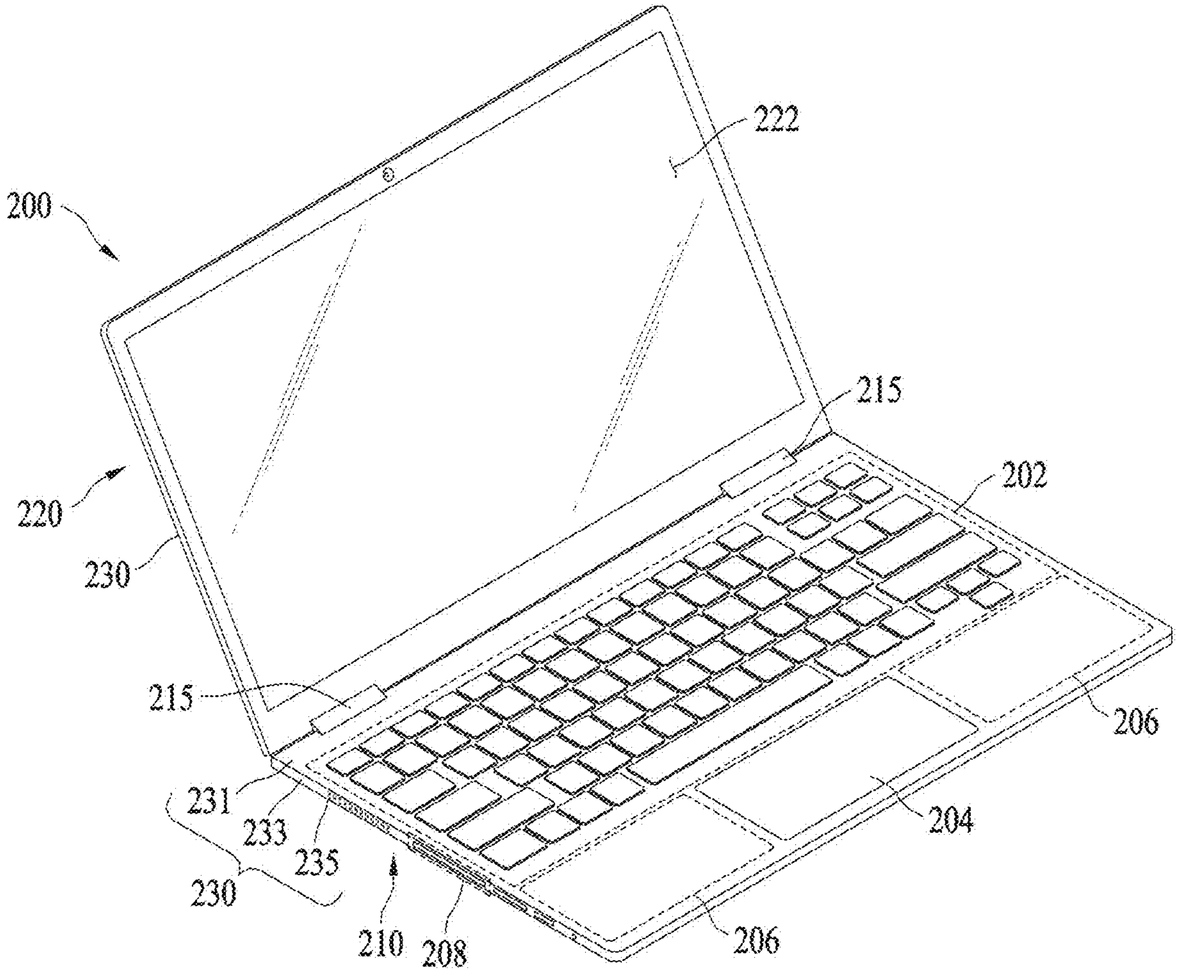
FIG. 2 is a perspective view of an electronic device according to an embodiment of the disclosure.

FIG. 2 is a perspective view of an electronic device according to an embodiment of the disclosure.

Referring to FIG. 2, an electronic device 200 (e.g., the electronic device 101 of FIG. 1) may include a first housing 210, a connector 215, a display 220 (e.g., the display module 160 of FIG. 1), and a second housing 230. The electronic device 200 may include, for example, a smartphone, a laptop computer, a tablet personal computer (PC), an e-book reader, a portable multimedia device, a portable medical device, a wearable device, or a home appliance.

The first housing 210 may include a keyboard 202, a touchpad 204, a palm rest 206, and an antenna module 208. The keyboard 202 (e.g., the input device 150 of FIG. 1) may include a plurality of keys on an upper portion of the first housing 210. The keyboard 202 may receive numeric or character information. The keyboard 202 may include a plurality of input keys and function keys for setting various functions of the electronic device 200. The function keys may include an arrow key, a volume key, and/or a shortcut key set to perform a designated function. The keyboard 202 may include one of a qwerty keypad, a 3*4 keypad, a 4*3 keypad, or a touch key. The touchpad 204 may replace a function of a mouse. The touchpad 204 may input a command to select or execute an application displayed on the display 220. The palm rest 206 may be a pedestal for reducing wrist fatigue of a user of the electronic device 200 when the user is using the keyboard 202. The antenna module 208 (e.g., the antenna module 197 of FIG. 1) may transmit or receive a signal or power to or from an external electronic device (e.g., the electronic devices 102 and 104, and/or the server 108 of FIG. 1).

The connector 215 may foldably or unfoldably couple the first housing 210 to the display 220. The connector 215 may mechanically connect the first housing 210 and the display 220. The connector 215 may include, for example, a hinge member between the first housing 210 and the display 220. The connector 215 may electrically connect the first housing 210 and the display 220. The connector 215 may include, for example, a flexible printed circuit board (FPCB) between the first housing 210 and the display 220.

The display 220 may include a screen 222. The screen 222 may display information input by the user and information to be provided to the user using various menus and the keyboard 202 of the electronic device 200. The screen 222 may be formed of at least one of a liquid crystal display (LCD), an organic light-emitting diode (OLED), an active-matrix organic light-emitting diode (AMOLED), a flexible display, or a transparent display. The screen 222 may provide at least one of various screens, such as a home screen, a menu screen, a lock screen, a game screen, a webpage screen, a call screen, or a music or video playback screen according to use of the portable electronic device 200.

The second housing 230 may form an exterior of the first housing 210. The second housing 230 may also be applied to the palm rest 206 positioned in the first housing 210. The second housing 230 may protect at least one electronic component (e.g., the processor 120, the memory 130, the sensor module 176 of FIG. 1, and other electronic components) included in the first housing 210. The second housing 230 may include a first surface 231 covering an upper surface, a second surface 233 covering a side surface, and a third surface 235 covering a rear surface of the first housing 210. The second housing 230 may form an exterior of the display 220. The second housing 230 may protect at least one of various electronic components (e.g., the camera module 180, the sound output module 155 of FIG. 1, and other electronic components) and the screen 222 included in the display 220.

Figure 3:
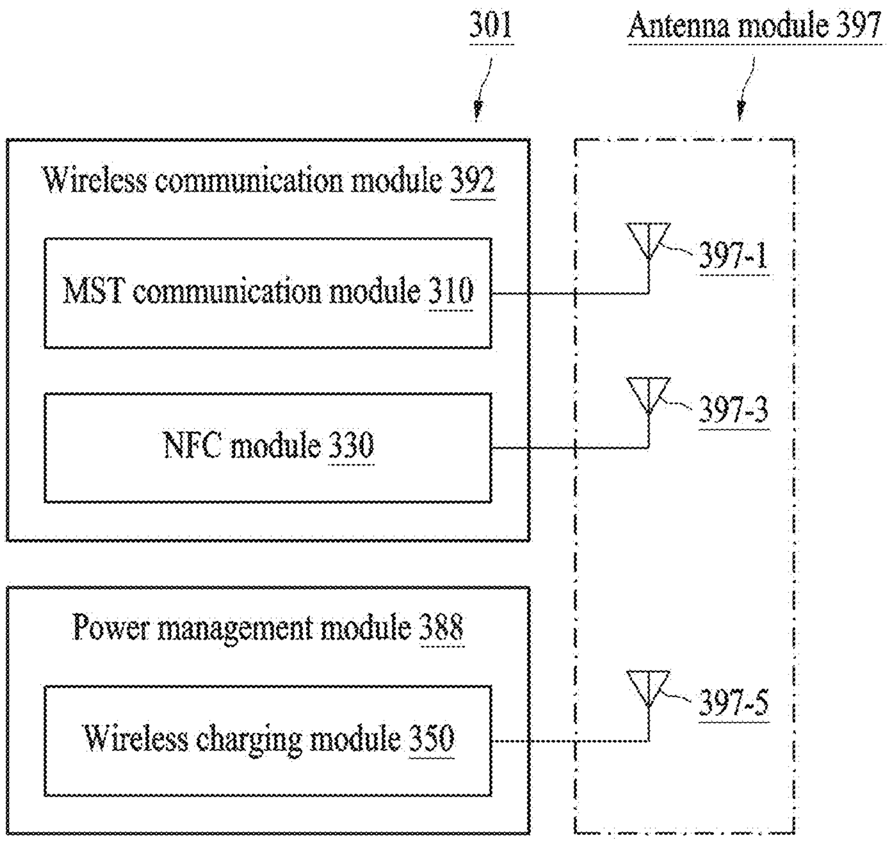
FIG. 3 is a block diagram of a wireless communication module, a power management module, and an antenna module of an electronic device according to an embodiment of the disclosure.

FIG. 3 is a block diagram of a wireless communication module, a power management module, and an antenna module of an electronic device according to an embodiment of the disclosure.

Referring to FIG. 3, a wireless communication module 392 may include a magnetic secure transmission (MST) communication module 310 or a near-field communication (NFC) module 330, and a power management module 388 may include a wireless charging module 350. In such a case, the antenna module 397 may include a plurality of antennas that include an MST antenna 397-1 connected to the MST communication module 310, an NFC antenna 397-3 connected to the NFC module 330, and a wireless charging antenna 397-5 connected to the wireless charging module 350. For ease of description, the same components as those described with reference to FIG. 3 are briefly described or omitted from the description.

The MST communication module 310 may receive a signal including control information or payment information such as card information from a processor 120, generate a magnetic signal corresponding to the received signal, and then transmit the generated magnetic signal to an external electronic device (e.g., a point-of-sale (POS) device) via the MST antenna 397-1. In order to generate the magnetic signal, according to an embodiment, the MST communication module 310 may include a switching module (not shown) that includes one or more switches connected to the MST antenna 397-1, and control the switching module to change a direction of a voltage or a current supplied to the MST antenna 397-1 according to the received signal. The change of the direction of the voltage or the current allows the direction of the magnetic signal (e.g., a magnetic field) transmitted via the MST antenna 397-1 to change accordingly. When detected by the external electronic device, the magnetic signal with its direction changing may cause an effect (e.g., a waveform) similar to that of a magnetic field that is generated when a magnetic card corresponding to the received signal (e.g., card information) is swiped through a card reader of the electronic device. According to an embodiment, for example, payment-related information and a control signal that are received by the electronic device in the form of the magnetic signal may be transmitted to an external server (e.g., a payment server) via a network.

The NFC module 330 may obtain a signal including control information or payment information such as card information from the processor 120, and transmit the obtained signal to the external electronic device via the NFC antenna 397-3. According to an embodiment, the NFC module 330 may receive such a signal transmitted from the external electronic device via the NFC antenna 397-3.

The wireless charging module 350 may wirelessly transmit power to the external electronic device (e.g., a cellular phone or a wearable device) via the wireless charging antenna 397-5, or wirelessly receive power from the external electronic device (e.g., a wireless charging device). The wireless charging module 350 may support one or more of various wireless charging schemes including, for example, a magnetic resonance scheme or a magnetic induction scheme.

According to an embodiment, some of the MST antenna 397-1, the NFC antenna 397-3, or the wireless charging antenna 397-5 may share at least a portion of radiators. For example, the radiator of the MST antenna 397-1 may be used as the radiator of the NFC antenna 397-3 or the wireless charging antenna 397-5, or vice versa. In such a case, the antenna module 397 may include a switching circuit (not shown) adapted to selectively connect (e.g., close) or disconnect (e.g. open) at least some of the antennas 397-1, 397-3, or 397-5 under the control of the wireless communication module 392 (e.g., the MST communication module 310 or the NFC module 330) or the power management module 388 (e.g., the wireless charging module 350). For example, when the electronic device 301 uses a wireless charging function, the NFC module 330 or the wireless charging module 350 may control the switching circuit to temporarily disconnect at least a partial area of the radiators shared by the NFC antenna 397-3 and the wireless charging antenna 397-5 from the NFC antenna 397-3 and to connect the at least one portion thereof to the wireless charging antenna 397-5.

According to an embodiment, at least one function of the MST communication module 310, the NFC module 330, or the wireless charging module 350 may be controlled by an external processor (e.g., the processor 120). According to an embodiment, a specified function (e.g., a payment function) of the MST communication module 310 or the NFC module 330 may be performed in a trusted execution environment (TEE). According to an embodiment, the TEE may form an execution environment in which, for example, at least a partially designated area of memory is allocated to be used for performing a function (e.g., a financial transaction or personal information-related function) that requires a relatively high level of security. In such a case, access to the at least designated area may be restrictively permitted, for example, according to an entity accessing thereto or an application being executed in the TEE.

Figure 4:
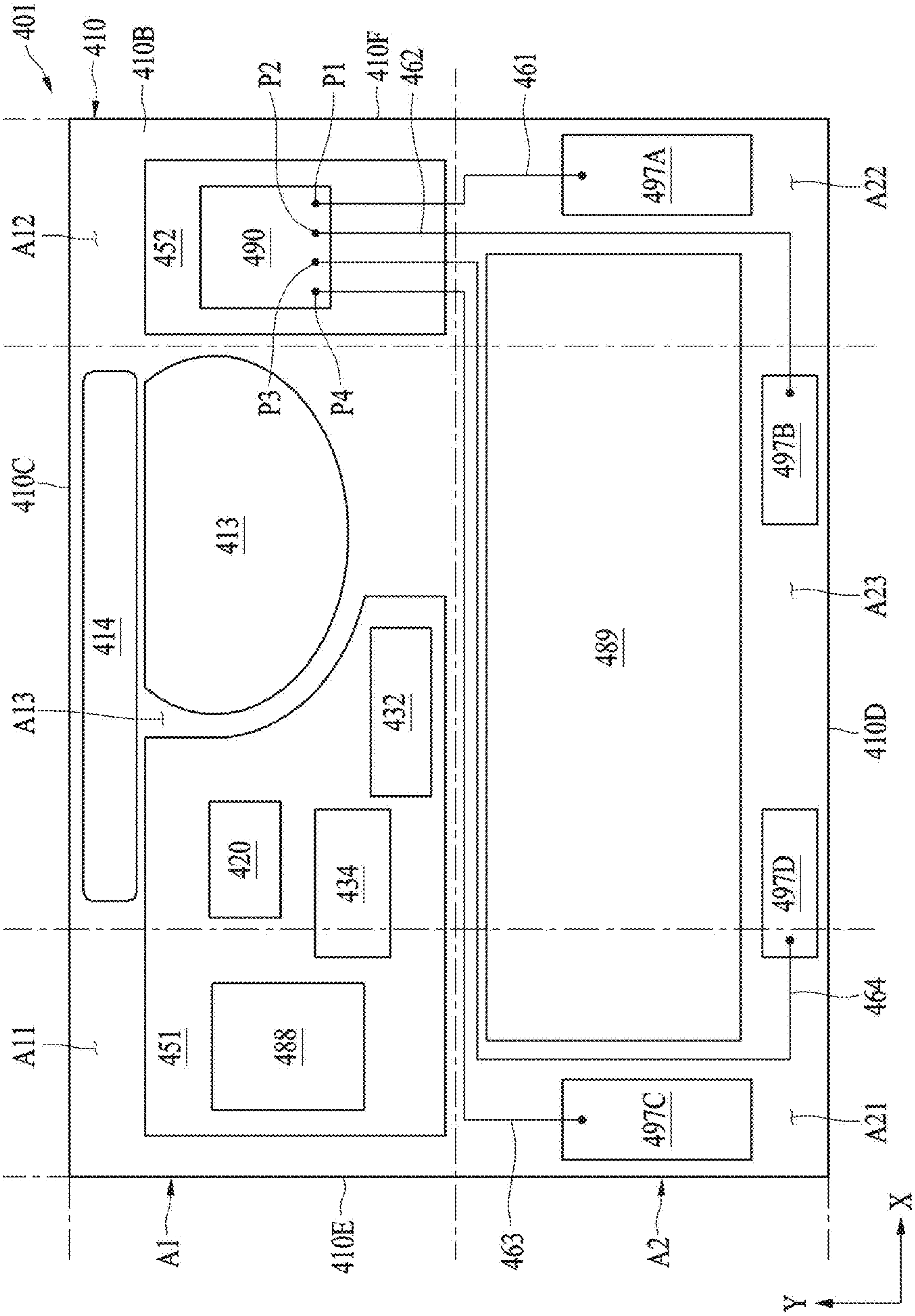
FIG. 4 is a block diagram of an electronic device according to an embodiment of the disclosure.

FIG. 4 is a block diagram of an electronic device according to an embodiment of the disclosure.

Figure 5:
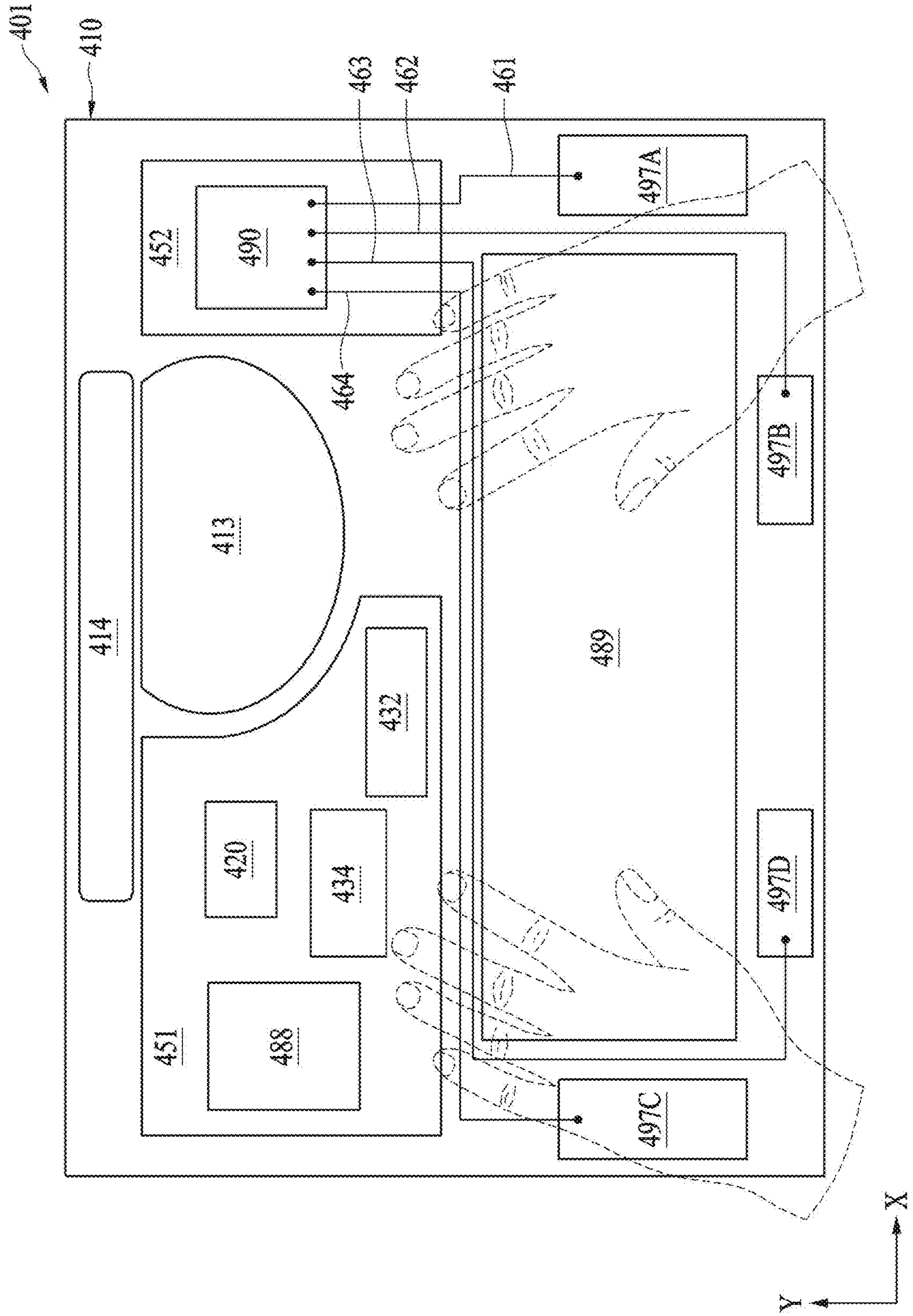
FIG. 5 is a block diagram of an electronic device in use according to an embodiment of the disclosure.

FIG. 5 is a block diagram of an electronic device in use according to an embodiment of the disclosure.

Referring to FIGS. 4 and 5, an electronic device 401 (e.g., the electronic device 101, 200, or 301) may include a housing 410 (e.g., the first housing 210 of FIG. 2) including a first surface (e.g., a front surface) (not shown), a second surface 410B (e.g., a rear surface) opposite to the first surface, and a plurality of side surface s 410C, 410D, 410E, and 410F between the first surface and the second surface 410B. The plurality of side surfaces 410C, 410D, 410E, and 410F may include a first side surface 410C (e.g., an upper side surface), a second side surface 410D (e.g., a lower side surface) opposite to the first side surface 410C, a third side surface 410E (e.g., a left side surface) between the first side surface 410C and the second side surface 410D, and a fourth side surface 410F between the first side surface 410C and the second side surface 410D, opposite to the third side surface 410E.

The housing 410 may include a first portion A1 (e.g., an upper portion) and a second portion A2 (e.g., a lower portion) that is different from the first portion A1. The first portion A1 may include a first side area A11 (e.g., a first left area) adjacent to the third side surface 410E, a second side area A12 (e.g., a first right area) adjacent to the fourth side surface 410F, and a first middle area A13 between the first side area A11 and the second side area A12. The second portion A2 may include a third side area A21 (e.g., a second left area) adjacent to the third side surface 410E, a fourth side area A22 (e.g., a second right area) adjacent to the fourth side surface 410F, and a second middle area A23 between the third side area A21 and the fourth side area A22. The first side area A11 and the third side area A21 may be on the same side. The second side area A12 and the fourth side area A22 may be on the same side.

The electronic device 401 may include a first PCB 451, a second PCB 452, a cooling module 413, a heat plate 414, a plurality of transmission lines 461, 462, 463, and 464, a battery 489 (e.g., the battery 189 of FIG. 1), and a plurality of antennas 497A, 497B, 497C, and 497D (e.g., the antenna modules 197, 208, and 397).

The electronic device 401 may include a processor 420 (e.g., the processor 120), volatile memory 432 (e.g., the volatile memory 132), non-volatile memory 434 (e.g., the non-volatile memory 134), and a power management module 488 (e.g., the power management module 188) on the first PCB 451. The first PCB 451 may be disposed in the first side area A11 and the first middle area A13.

The electronic device 401 may include a communication module 490 (e.g., the communication module 190) on the second PCB 452. The second PCB 452 may be disposed in the second side area A12.

The cooling module 413 may be configured to reduce heat generated from at least one component (e.g., the processor 420) of the electronic device 401. For example, the cooling module 413 may include a fan. The cooling module 413 may be disposed in the first middle area A13.

The heat plate 414 may be configured to absorb heat generated from at least one component of the electronic device 401, and dissipate and/or emit the heat into the air and/or to the outside. For example, the heat plate 414 may include a plurality of fins (not shown) to increase a contact area with air. The heat plate 414 may be disposed between the first side surface 410C and the cooling module 413 in the first middle area A13.

The battery 489 may supply power to at least one component of the electronic device 401. The battery 489 may be positioned in the second portion A2.

The communication module 490 may include a plurality of communication ports P1, P2, P3, and P4. For example, the plurality of communication ports P1, P2, P3, and P4 may each include a communication connector (e.g., an RF connector). For the specifications of the communication module 490 and the efficiency of arrangement of the communication module 490 in the electronic device 401, a first communication port P1 may include a transmission port, and a second communication port P2, a third communication port P3, and a fourth communication port P4 may each include a receiving port.

The plurality of antennas 497A, 497B, 497C, and 497D may include a first antenna 497A (e.g., a main antenna) configured to operate in a first frequency band, a second antenna 497B (e.g., a first MIMO antenna or a 5G antenna) configured to operate in a second frequency band, a third antenna 497C (e.g., an auxiliary antenna) configured to operate in a frequency band that may be substantially the same as the first frequency band or different from the first frequency band, and a fourth antenna 497D (e.g., a second MIMO antenna) configured to operate in a frequency band that may be substantially the same as or different from the first frequency band and/or the second frequency band.

The first antenna 497A may be disposed in the fourth side area A22. The second antenna 497B may be disposed between the battery 489 and the second side surface 410D. The third antenna 497C may be disposed in the third side area A21. The fourth antenna 497D may be disposed between the battery 489 and the second side surface 410D. The second antenna 497B and the fourth antenna 497D may be disposed to be offset from each other.

The electronic device 401 may include the plurality of transmission lines 461, 462, 463, and 464 respectively connecting the communication module 490 to the plurality of antennas 497A, 497B, 497C, and 497D. A first transmission line 461 may connect the first communication port P1 and the first antenna 497A. A second transmission line 462 may connect the second communication port P2 and the second antenna 497B. A third transmission line 463 may connect the third communication port P3 and the third antenna 497C. A fourth transmission line 464 may connect the fourth communication port P4 and the fourth antenna 497D.

At least one transmission line of the plurality of transmission lines 461, 462, 463, and 464 may include a coaxial cable. At least one transmission line of the plurality of transmission lines 461, 462, 463, and 464 may include an FPCB, a flat ribbon cable (FRC), a compatible cable (e.g., a 2-in-1 cable), or any other suitable cables designed to have an equivalent structure as the coaxial cable.

The electronic device 401 may include a keyboard (e.g., the keyboard 202 of FIG. 2) (not shown), and a palm rest (e.g., the palm rest 206) (not shown). The keyboard may be disposed in the first portion A1. The palm rest may be disposed in the second portion A2.

In a typical usage scenario of the electronic device 401 which uses a QWERTY keyboard, the user's left fingers may be placed on a A key, an S key, a D key, and an F key, respectively, and the user's right fingers may be placed on a J key, a K key, an L key, a ";" key, respectively. When the user places his or her hands on the keyboard to use the keyboard, the user's left hand substantially covers most of the third antenna 497C, while the user's right hand covers a portion (e.g., a portion of a lower end portion) of the first antenna 497A. Accordingly, the first antenna 497A may receive less interference from the user's hand than the third antenna 497C.

Figure 6:
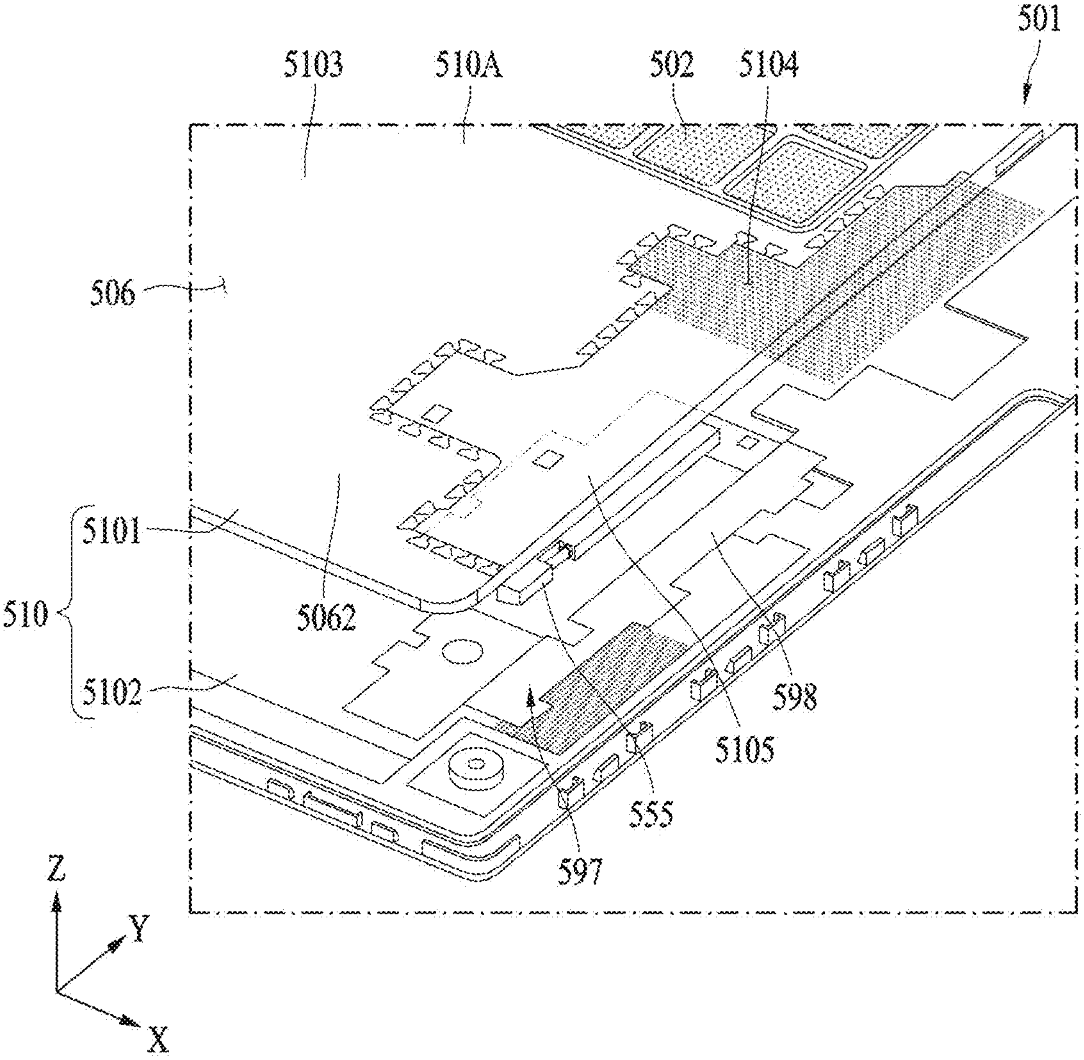
FIG. 6 is an exploded perspective view of a portion of an electronic device according to an embodiment of the disclosure.

FIG. 6 is an exploded perspective view of a portion of an electronic device according to an embodiment of the disclosure.

Figure 7:
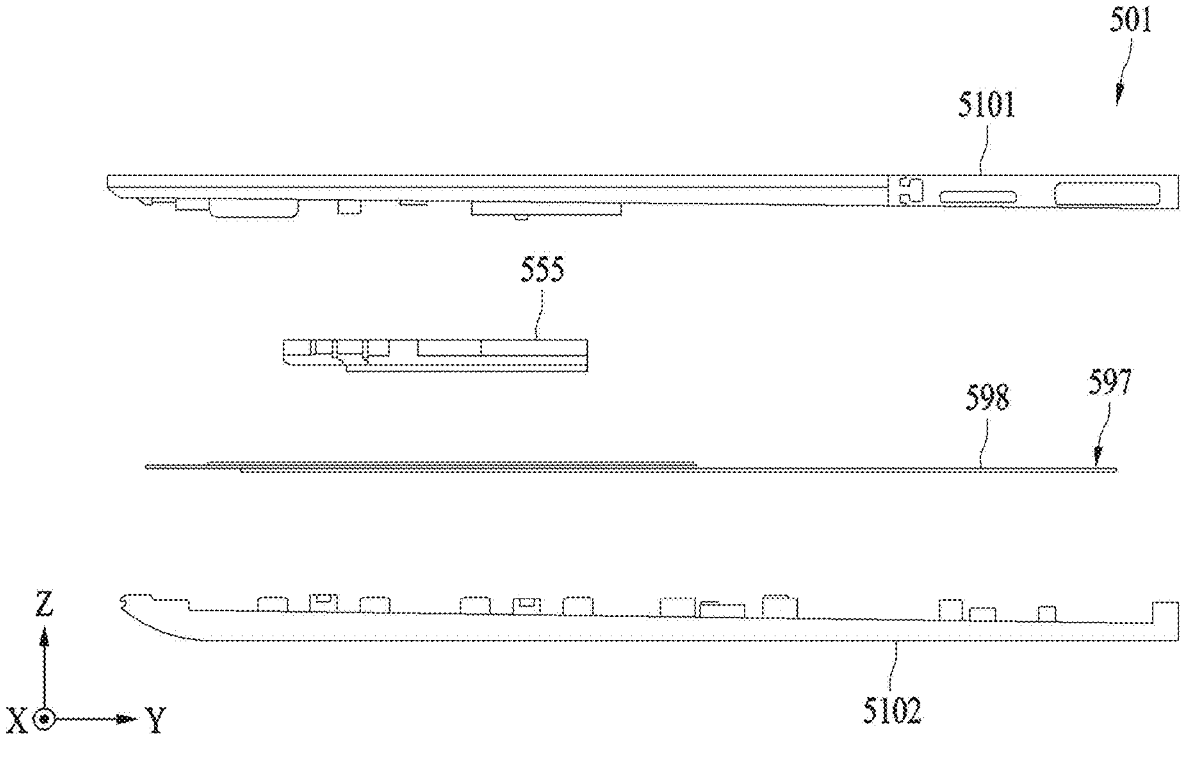
FIG. 7 is an exploded side view of an electronic device according to an embodiment of the disclosure.

FIG. 7 is an exploded side view of an electronic device according to an embodiment of the disclosure.

Figure 8:
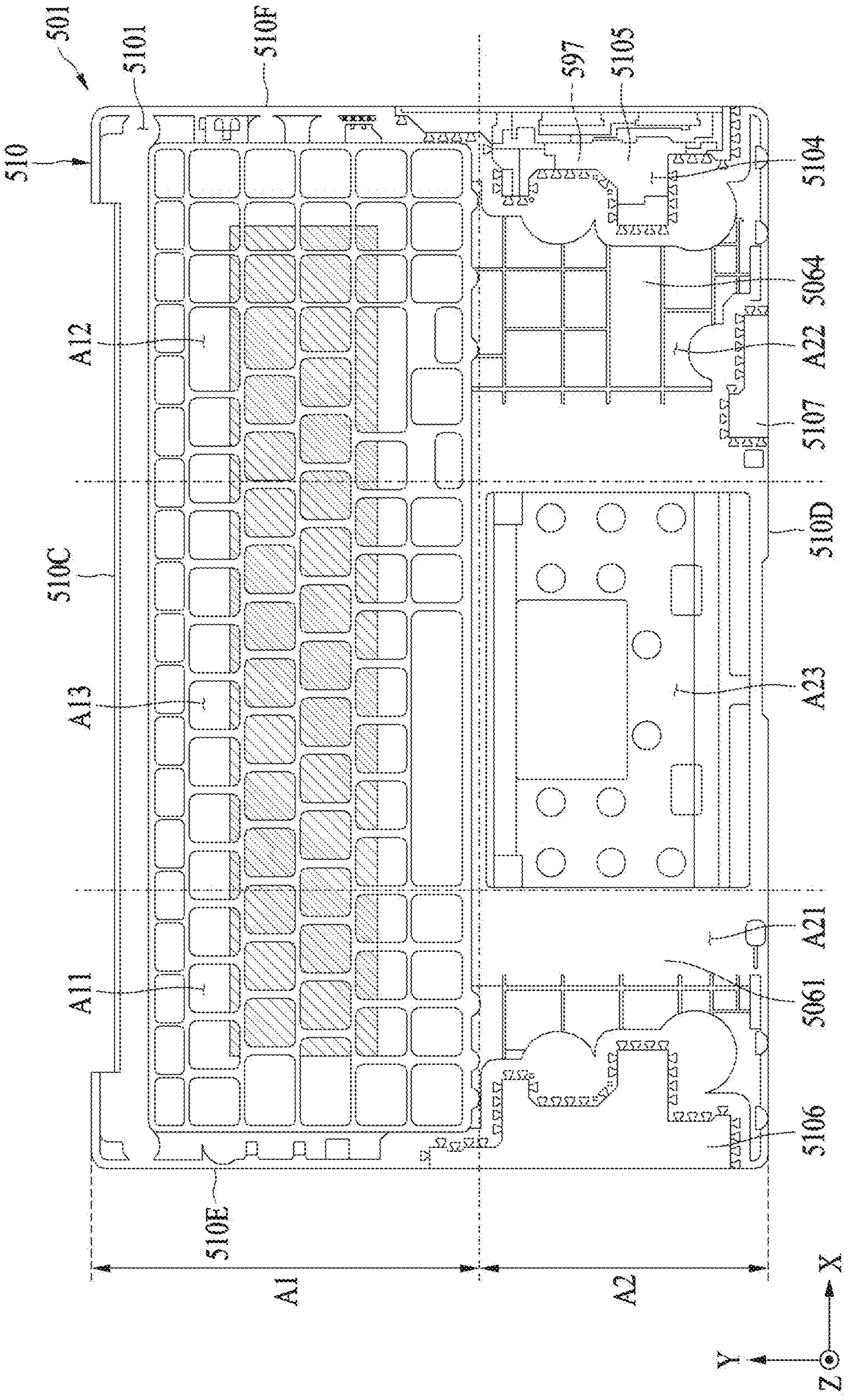
FIG. 8 is a front view of an electronic device according to an embodiment of the disclosure.

FIG. 8 is a front view of an electronic device according to an embodiment of the disclosure.

Figure 9:
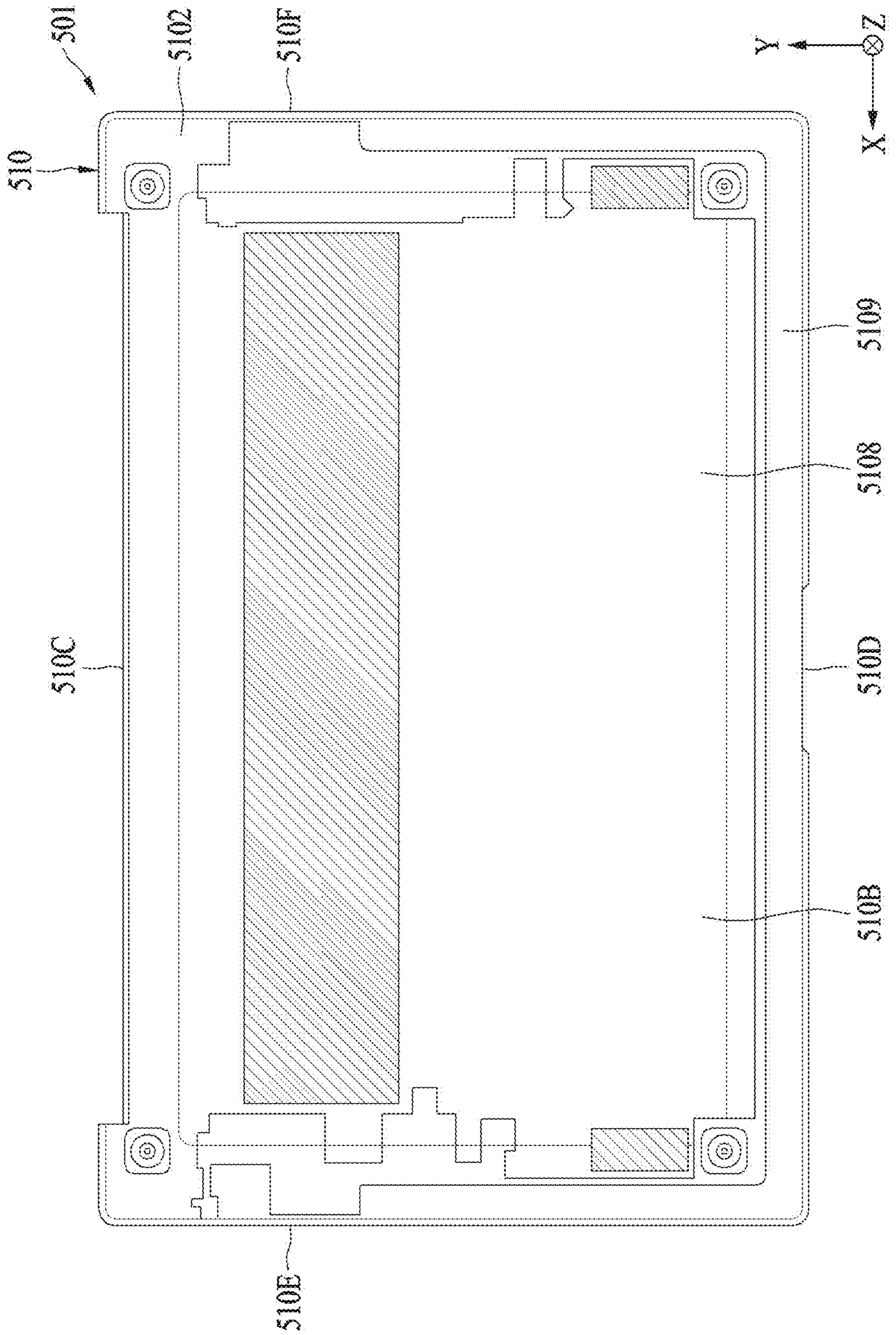
FIG. 9 is a rear view of an electronic device according to an embodiment of the disclosure.

FIG. 9 is a rear view of an electronic device according to an embodiment of the disclosure.

Referring to FIGS. 6 to 9, an electronic device 501 (e.g., the electronic device 101, 200, 301, or 401) may include a housing 510 (e.g., the housing 210 or 410). The housing 510 may include a first cover 5101 (e.g., a front cover) including a first surface 510A (e.g., a front surface) or including the first surface 510A and at least some side surfaces of a plurality of side surfaces 510C, 510D, 510E, and 510F (e.g., the side surfaces 410C, 410D, 410E, and 410F), and a second cover 5102 (e.g., a rear cover) including a second surface 510B (e.g., a rear surface or the second surface 410B) or including the second surface 510B and at least some side surfaces of the plurality of side surfaces 510C, 510D, 510E, and 510F (e.g., the side surfaces 410C, 410D, 410E, and 410F).

The first cover 5101 may include a keyboard 502 (e.g., the keyboard 202) disposed in the first side area A11, the second side area A12, and the first middle area A13 of the first portion A1. The first cover 5101 may include a first palm rest 5061 (e.g., the palm rest 206) disposed in the third side area A21 of the second portion A2, and a second palm rest 5064 (e.g., the palm rest 206) disposed in the fourth side area A22 of the second portion A2. The first palm rest 5061 and the second palm rest 5064 may be disposed on both sides of the second middle area A23.

The first cover 5101 may include a first part 5103 that occupies most of the area of the first cover 5101, a radiating opening 5104 formed in at least a portion of the second palm rest 5064, and a second part 5105 disposed in the radiating opening 5104. The radiating opening 5104 may be formed to extend in a specific direction (e.g., +/−Y direction) along a fourth side surface 510F. The radiating opening 5104 may be positioned in the fourth side area A22. At least a portion of the radiating opening 5104 may also be positioned in the second side area A12.

In an embodiment, the first part 5103 may include a metal material, and the second part 5105 may include a plastic material. The first part 5103 and the second part 5105 may be formed by double injection or formed integrally by injection bonding. In an embodiment, the first part 5103 and the second part 5105 may each include a plastic material. The first part 5103 and the second part 5105 may be seamlessly integrally formed.

The first cover 5101 may include a third part 5106 disposed on at least a portion of the first palm rest 5061, and a fourth part 5107 disposed on at least a portion of the second palm rest 5064. The third part 5106 may extend in a specific direction (e.g., +/−Y) along the third side surface 510E. The fourth part 5107 may extend in a specific direction (e.g., +/−X direction) along the second side surface 510D. The third part 5106 and the fourth part 5107 may each include a plastic material.

The second cover 5102 may include a fifth part 5108 and a sixth part 5109. The third part 5106 may occupy most of the area of the second cover 5102. The fourth part 5107 may be disposed between the third part 5106 and the second side surface 510D (e.g., the second side surface 410D), between the third part 5106 and the third side surface 510E (e.g., the third side surface 410E), and between the third part 5106 and the fourth side surface 510F (e.g., the fourth side surface 410F).

In an embodiment, the third part 5106 may include a metal material, and the fourth part 5107 may include a plastic material. The third part 5106 and the fourth part 5107 may be formed by double injection or formed integrally by injection bonding. In an embodiment, the third part 5106 and the fourth part 5107 may each include a plastic material. The third part 5106 and the fourth part 5107 may be seamlessly integrally formed.

The electronic device 501 may include a plurality of antennas disposed between the first cover 5101 and the second cover 5102. A first antenna 597 (e.g., the first antenna 497A) may at least partially overlap the second palm rest 5064. The first antenna 597 may at least partially overlap the radiating opening 5104 and the second part 5105. A second antenna (not shown) (e.g., the second antenna 497B) may be disposed to overlap the third part 5106 and the sixth part 5109. A third antenna (not shown) (e.g., the third antenna 497C) may be disposed to overlap the fourth part 5107 and the sixth part 5109. A fourth antenna (not shown) (e.g., the fourth antenna 497D) may be disposed to overlap the sixth part 5109.

Any component may be disposed between the first antenna 597 and the first cover 5101 and/or between the first antenna 597 and the second cover 5102. The component may be disposed so that its metal component does not overlap a main radiation pattern (e.g., a feed pattern 5912) of the first antenna 597. For example, the electronic device 501 may include a speaker 555 (e.g., the sound output module 155) disposed between the first cover 5101 and a PCB 598 of the first antenna 597.

Figure 10:
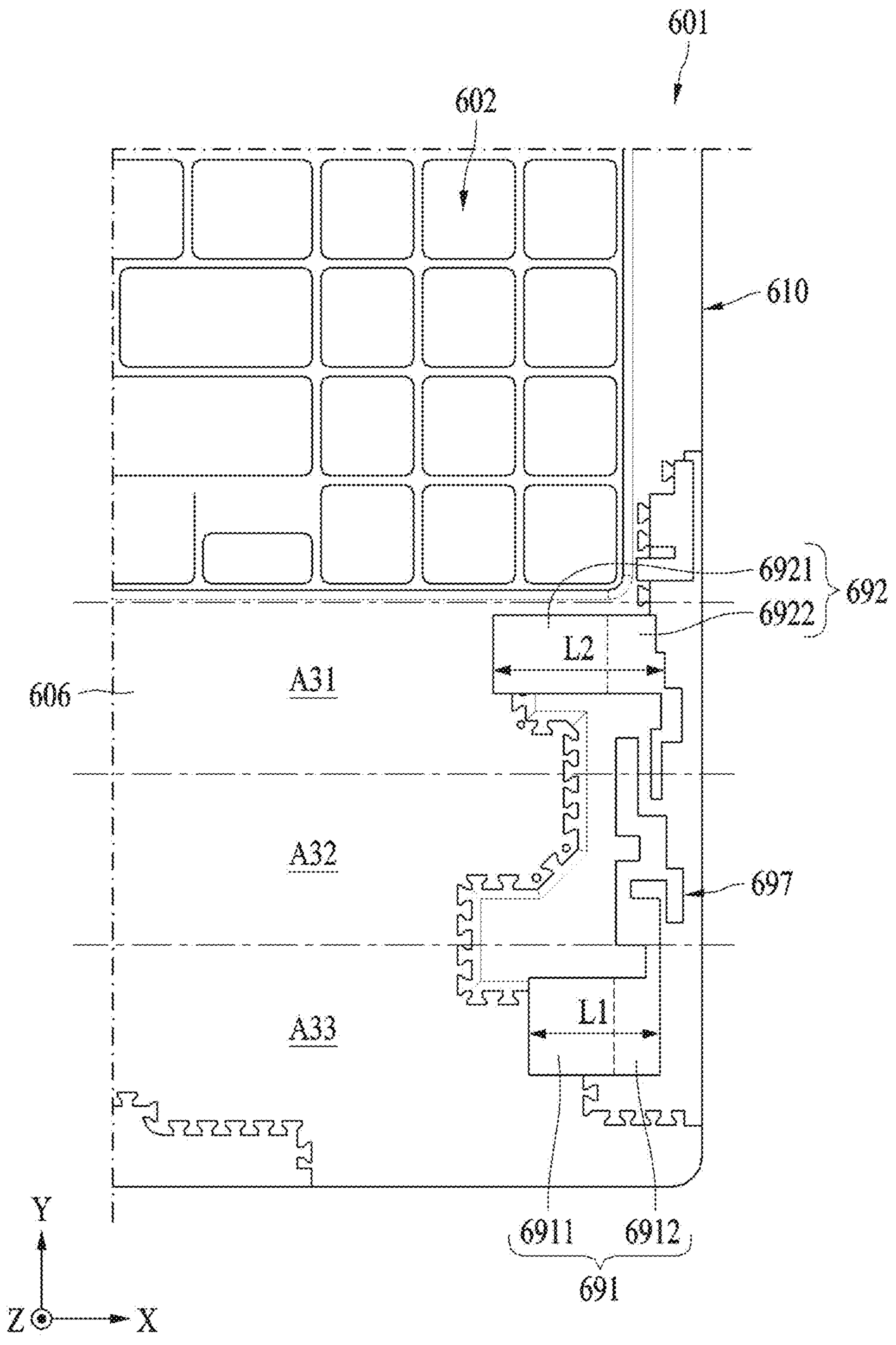
FIG. 10 is a plan view of an antenna in an electronic device according to an embodiment of the disclosure.

FIG. 10 is a plan view of an antenna in an electronic device according to an embodiment of the disclosure.

Figure 11:
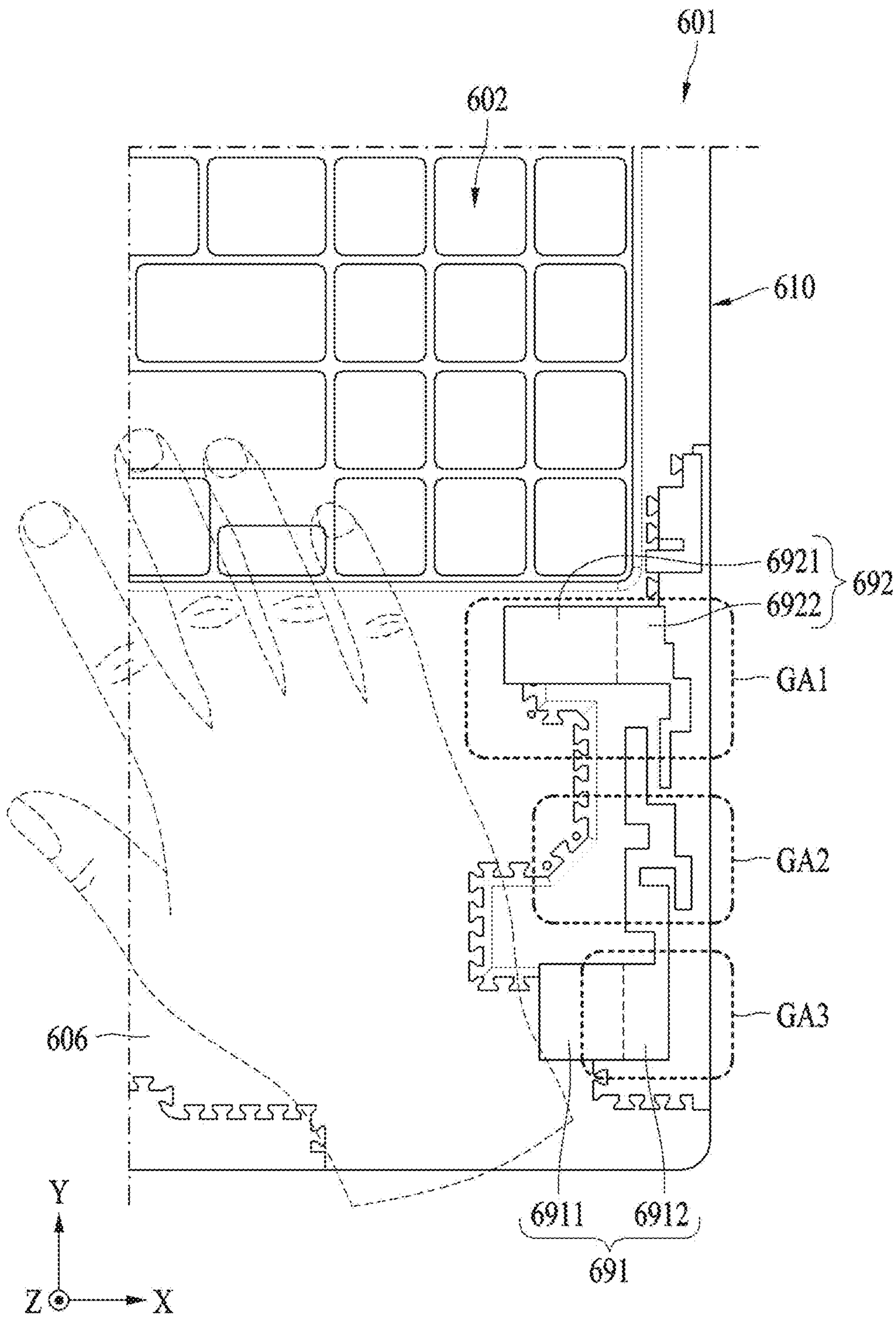
FIG. 11 is a plan view of an antenna in an electronic device in use according to an embodiment of the disclosure.

FIG. 11 is a plan view of an antenna in an electronic device in use according to an embodiment of the disclosure.

Referring to FIGS. 10 and 11, an electronic device 601 (e.g., the electronic device 501 of FIGS. 6 to 9) may include a keyboard 602 (e.g., the keyboard 502), a palm rest 606 (e.g., the second palm rest 5064), a housing 610 (e.g., the housing 510), and an antenna 697 (e.g., the first antenna 597).

The palm rest 606 may include a plurality of rest areas A31, A32, and A33. A first rest area A31 may be an area adjacent to the keyboard 602. A second rest area A32 may be an area between the keyboard 602 and a third rest area A33. The third rest area A33 may be an area away from the keyboard 602. In an embodiment, the plurality of rest areas may be two areas. For example, the plurality of rest areas may be defined as an area adjacent to the keyboard 602 (e.g., the first rest area A31) and an area away from the keyboard 602 (e.g., the third rest area A33).

The antenna 697 may include a feed pattern 691. The feed pattern 691 may include a first ground area 6911 electrically connected to a first portion (a portion of the first cover 5101) of the housing 610, and a feed area 6912 electrically connected to the first ground area 6911. The feed area 6912 may be implemented as a main radiation pattern of the antenna 697.

The first ground area 6911 may be positioned in the third rest area A33. The feed area 6912 may be substantially disposed in the second rest area A32 and the third rest area A33. The feed area 6912 may be disposed in at least a portion of the first rest area A31.

The first ground area 6911 may extend from an area where the antenna 697 is disposed among areas of the housing 610 towards an area (e.g., a central area) where another electronic component (e.g., the battery 489 of FIGS. 4 and 5) is disposed, in a direction (e.g., the −Y direction) away from the antenna 697. Even when the first ground area 6911 interferes with the human body (e.g., hand), it may not affect the SAR standard of the antenna 697 and human contact detection (e.g., grip detection).

The first ground area 6911 and the feed area 6912 may be physically connected, coupled, or combined. The first ground area 6911 and the feed area 6912 may be connected, coupled, or combined through another electric component (e.g., a capacitor or an inductor).

The antenna 697 may include a grip sensing pattern 692. The grip sensing pattern 692 may include a second ground area 6921 electrically connected to a second portion (e.g., the other portion of the first cover 5101) different from the first portion of the housing 610, and a coupling area 6922 electrically connected to the second ground area 6921. The coupling area 6922 may be configured to couple with the feed area 6912. The coupling area 6922 may be implemented as at least a portion of a circuit for responding to detection of human contact when the human body (e.g., a hand) touches the antenna 697 through the housing 610. As the coupling area 6922 forms a portion of the pattern of the antenna 697 rather than a floating metal, it may serve as a tuning pattern that expands a bandwidth of a low band.

The second ground area 6921 may be disposed in the first rest area A31. The coupling area 6922 may be substantially disposed in the first rest area A31. The coupling area 6922 may be disposed in a portion of the second rest area A32.

The second ground area 6921 may extend from an area where the antenna 697 is disposed among the areas of the housing 610 towards an area (e.g., a central area) where another electronic component (e.g., the battery 489 of FIGS. 4 and 5) is disposed, in a direction (e.g., the −Y direction) away from the antenna 697. Even when the second ground area 6921 interferes with the human body (e.g., hand), it may not affect the SAR standard of the antenna 697 and human contact detection (e.g., grip detection).

The second ground area 6921 and the coupling area 6922 may be physically connected, coupled, or combined. The second ground area 6921 and the coupling area 6922 may be connected, coupled, or combined through another electric component (e.g., a capacitor or an inductor).

The coupling area 6922 may be physically separated from the feed area 6912. The feed area 6912 and the coupling area 6922 may be disposed not to interfere with the radiation of the antenna 697. The feed area 6912 and the coupling area 6922 may be disposed to enable the antenna 697 to detect human contact when the human body (e.g., a hand) contacts the antenna 697.

When detecting the human contact, the antenna 697 may have different sensitivities (e.g., capacitance differential) for each of the rest areas A31, A32, and A33 where the antenna 697 is disposed. For example, when a detection threshold value is preset (e.g., about 312), the first rest area A31 may have a sensitivity of about 10,000, the second rest area A32 may have a sensitivity of about 4,500, and the third rest area A33 may have a sensitivity of about 800. In an embodiment, different sensitivities may be set in a sensor module (e.g., the sensor module 176 of FIG. 1) for each of the rest areas A31, A32, and A33 where the antenna is disposed.

When detecting the human contact, the antenna 697 may have a different detection range for each of the rest areas A31, A32, and A33 where the antenna 697 is disposed. The first rest area A31 may have a first detection range GA1, the second rest area A32 may have a second detection range GA2 that is smaller than the first detection range GA1, and the third rest area A33 may have a third detection range GA3 that is smaller than the second detection range GA2. Since the contact detection range is set differently depending on the position of the antenna 697, the response sensitivity to human contact detection may be distributed. For example, a length L2 of the grip sensing pattern 692 disposed in an area (e.g., the first rest area A31) adjacent to the keyboard 602 (a length of the grip sensing pattern 692 in a direction (an X-axis direction) parallel to the keyboard 602) may be formed to be longer than a length L1 of the feed pattern 691 disposed in an area (e.g., the third rest area A33) away from the keyboard 602 (a length of the feed pattern 691 in the direction (X-axis direction) parallel to the keyboard 602.

Figure 12:
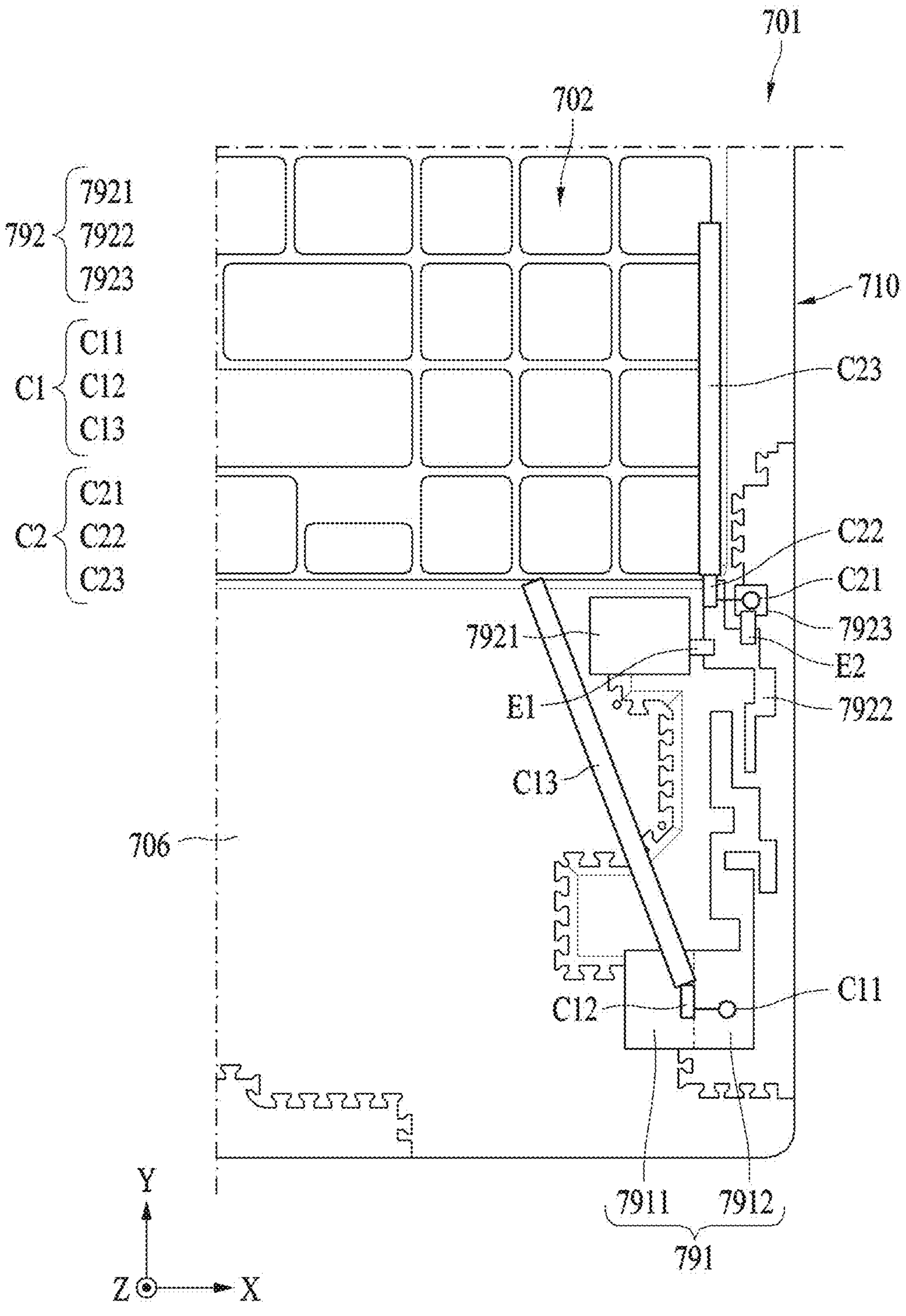
FIG. 12 is a plan view of an antenna and a transmission line for connecting the antenna according to an embodiment of the disclosure.

FIG. 12 is a plan view of an antenna and a transmission line for connecting the antenna according to an embodiment of the disclosure.

Figure 13:
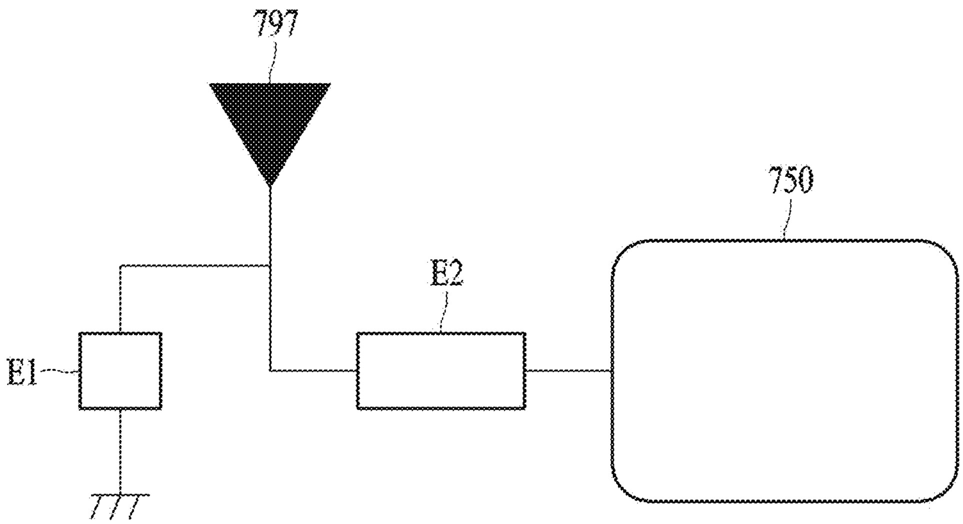
FIG. 13 is a circuit diagram of an antenna and a transmission line for connecting the antenna according to an embodiment of the disclosure.

FIG. 13 is a circuit diagram of an antenna and a transmission line for connecting the antenna according to an embodiment of the disclosure.

Referring to FIGS. 12 and 13, an electronic device 701 (e.g., the electronic device 501 of FIGS. 6 to 9) may include a keyboard 702 (e.g., the keyboard 502), a palm rest 706 (e.g., the second palm rest 5064), a housing 710 (e.g., the housing 510), and an antenna 797 (e.g., the first antenna 597).

The antenna 797 may include a feed pattern 791 (e.g., the feed pattern 691) and a grip sensing pattern 792 (e.g., the grip sensing pattern 692). The feed pattern 791 may include a first ground area 7911 (e.g., the first ground area 6911) and a feed area 7912 (e.g., the feed area 6912). The grip sensing pattern 792 may include a second ground area 7921 (e.g., the second ground area 6921) and a coupling area 7922 (e.g., the coupling area 6922).

The coupling area 7922 may include a connection area 7923. The connection area 7923 may be physically separated from the coupling area 7922. The connection area 7923 may be positioned in a rest area (e.g., the first rest area A31) where the second ground area 7921 and/or the coupling area 7922 are provided, among rest areas of the palm rest 706.

The antenna 797 may include a first electric element E1 connecting the second ground area 7921 and the coupling area 7922. The first electric element E1 may block direct current components. For example, the first electric element E1 may include a capacitor.

The antenna 797 may include a second electric element E2 connecting the coupling area 7922 and the connection area 7923. The second electric element E2 may block a current in a specific frequency band. For example, the second electric element E2 may include an inductance.

The electronic device 701 may include a first transmission line C1 for connecting the feed pattern 791. The first transmission line C1 may include a first connector C11, a first ground portion C12, and a first extension portion C13.

The first connector C11 may be connected to the feed area 7912. The first connector C11 may be positioned in the feed area 7912.

The first ground portion C12 may connect the first connector C11 and the first extension portion C13. The first ground portion C12 may be positioned in the first ground area 7911. The first ground portion C12 may be electrically connected to (e.g., in contact with) the first ground area 7911 and/or the first portion of the housing 710.

The first extension portion C13 may be connected to a communication module (not shown) (e.g., the communication module 490 of FIG. 4).

In an embodiment, the first transmission line C1 may include a coaxial cable. In an embodiment, the first transmission line C1 may be implemented as any other line having an equivalent structure to the coaxial cable. For example, the first transmission line C1 may include an FPCB, an FRC, or a compatible cable (e.g., a 2-in-1 cable).

The electronic device 701 may include a second transmission line C2 for connecting the grip sensing pattern 792. The second transmission line C2 may include a second connector C21, a second ground portion C22, and a second extension portion C23.

The second connector C21 may be connected to the connection area 7923. The second connector C21 may be positioned in the connection area 7923.

The second ground portion C22 may connect the second connector C21 and the second extension portion C23. The second ground portion C22 may be positioned in the coupling area 7922. The second ground portion C22 may be electrically connected to (e.g., in contact with) a second portion of the housing 710 that is different from the first portion. The second ground portion C22 may reduce the influence on the antenna 797 by the coupling due to frequency interference (e.g., radio frequency (RF) interference) noise that may occur within the electronic device 701 by the second transmission line C2, as a radiator. The second ground portion C22 may be electrically connected to (e.g., in contact with) the first ground area 7911.

The second extension portion C23 may be connected to a sensor module 750 (e.g., the sensor module 176 of FIG. 1) in which a human contact detection circuit is implemented within the electronic device 701.

In an embodiment, the second transmission line C2 may include a coaxial cable. In an embodiment, the second transmission line C2 may be implemented as any other line having an equivalent structure to the coaxial cable. For example, the second transmission line C2 may include FPCB, an FRC, or a compatible cable (e.g., a 2-in-1 cable).

Figure 14:
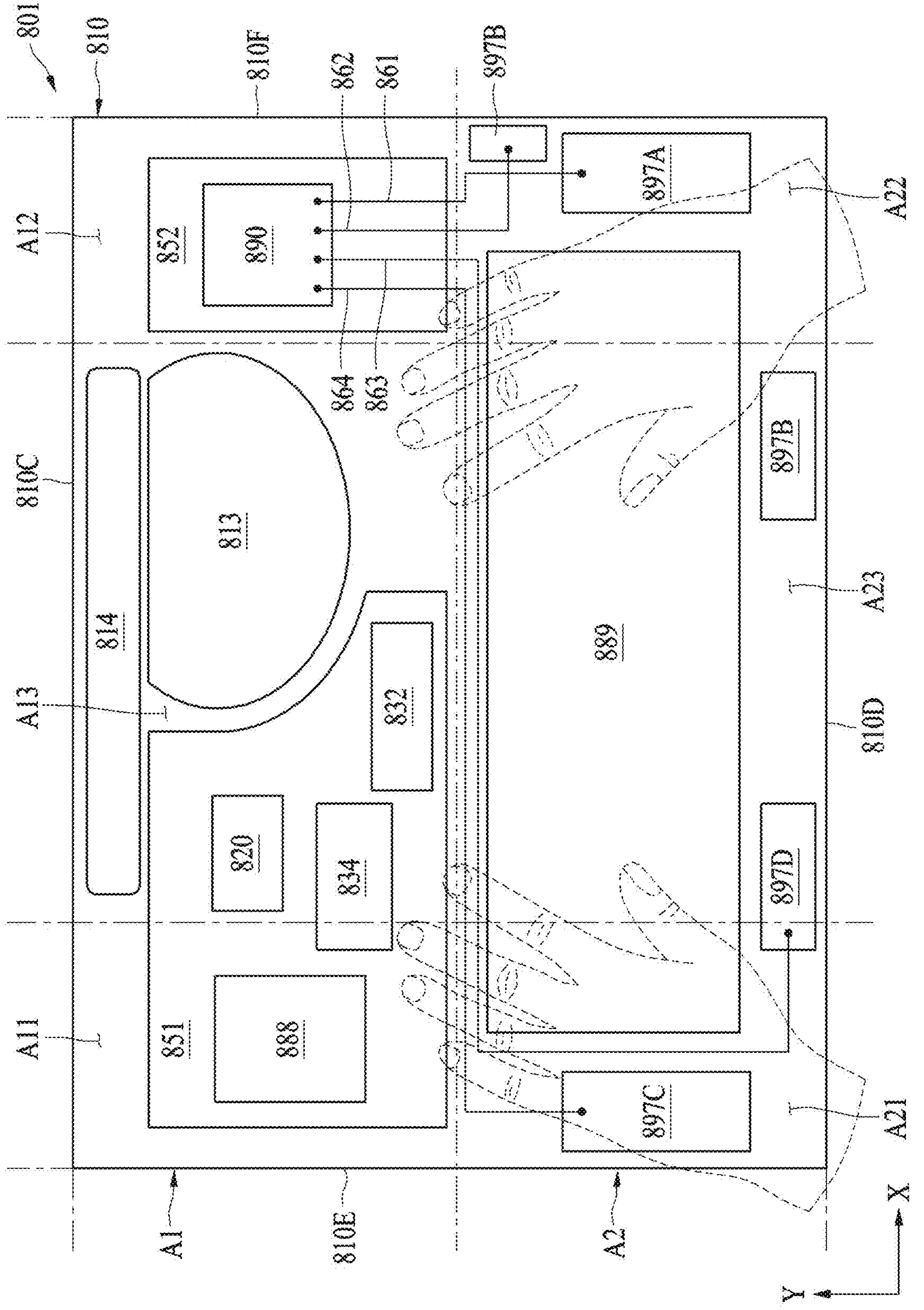
FIG. 14 is a block diagram of an electronic device in use according to an embodiment of the disclosure.

FIG. 14 is a block diagram of an electronic device in use according to an embodiment of the disclosure.

Referring to FIG. 14, an electronic device 801 (e.g., the electronic device 401 of FIGS. 4 and 5) may include a housing 810 (e.g., the housing 410). The housing 810 may include a first surface (not shown) (e.g., the first surface 510A of FIG. 6 or a front surface), a second surface (not shown) (e.g., the second surface 510B of FIG. 9 or a rear surface), and a plurality of side surfaces 810C, 810D, 810E, and 810F) (e.g., the side surfaces 410C, 410D, 410E, and 410F). The housing 810 may include a first portion A1 and a second portion A2. The first portion A1 may include a first side area A11, a second side area A12, and a first middle area A13. The second portion A2 may include a third side area A21, a fourth side area A22, and a second middle area A23.

The electronic device 801 may include a cooling module 813 (e.g., the cooling module 413), a heat plate 814 (e.g., the heat plate 414), and a battery 889 (e.g., the battery 489).

The electronic device 801 may include a first PCB 851 (e.g., the first PCB 451) and a second PCB 852 (e.g., the second PCB 452). The first PCB 851 may include a processor 820 (e.g., the processor 420), volatile memory 832 (e.g., the volatile memory 432), non-volatile memory 834 (e.g., the non-volatile memory 434), and a power management module 888 (e.g., the power management module 488). The second PCB 852 may include a communication module 890 (e.g., the communication module 490).

The electronic device 801 may include a first antenna 897A (e.g., the first antenna 497A), a second antenna 897B (e.g., the second antenna 497B), a third antenna 897C (e.g., the third antenna 497C), and a fourth antenna 897D (e.g., the fourth antenna 497D). The electronic device 801 may include a first transmission line 861 (e.g., the first transmission line 461), a second transmission line 862 (e.g., the second transmission line 462), a third transmission line 863 (e.g., the third transmission line 463), and a fourth transmission line 864 (e.g., the fourth transmission line 464).

The electronic device 801 may provide dual connectivity of the first frequency band and/or the second frequency band. For example, the second antenna 897B may transmit a signal in the second frequency band while the first antenna 897A transmits a signal in the first frequency band. The electronic device 801 may transmit and receive signals in the first frequency band (e.g., an anchor band) while communicating with a first base station (e.g., eNB), and may transmit and receive signals in the first frequency band and/or the second frequency band by communicating with a second base station (e.g., gNB).

The first frequency band, as a legacy band, may include a first band (e.g., a low band (LB), about 0.6 gigahertz (GHz) to about 1.0 GHZ), a second band (e.g., a mid band (MB), about 1.7 GHZ to about 2.3 GHZ), and a third band (e.g., a high band (HB), about 2.3 GHZ to about 2.7 GHZ).

The second frequency band may include a frequency band higher than the first frequency band. The second frequency band may include a millimeter wave frequency band. The second frequency band may include, for example, the first band, the second band, the third band, and a fourth band (e.g., an ultra-high band (UHB), about 3.3 GHz to about 4.3 GHZ).

The second antenna 897B may be disposed adjacent to the first antenna 897A. The second antenna 897B may be disposed between the communication module 890 and the first antenna 897A and in the fourth side area A22.

Figure 15:
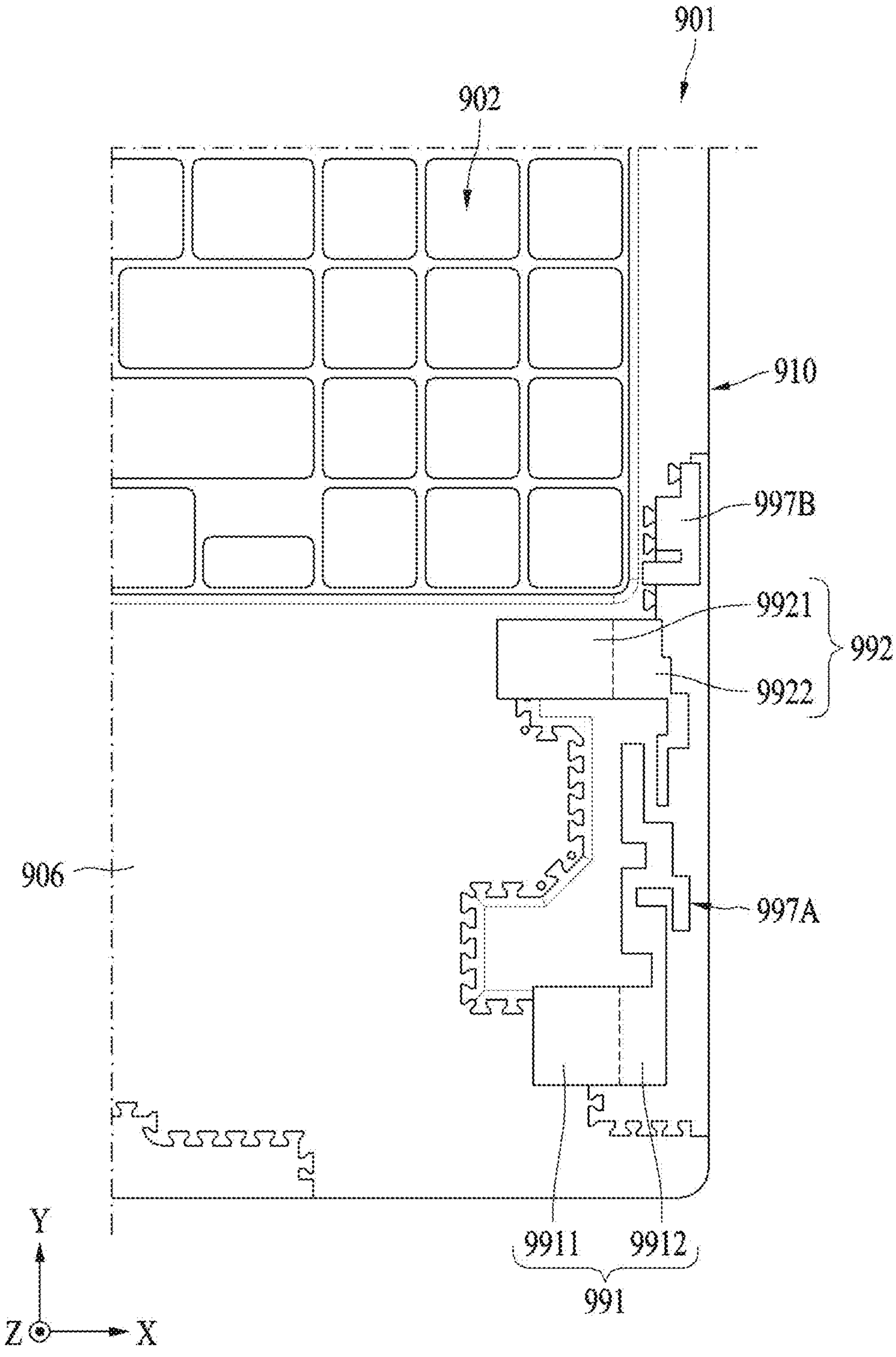
FIG. 15 is a plan view of antennas in an electronic device according to an embodiment of the disclosure.

FIG. 15 is a plan view of antennas in an electronic device according to an embodiment of the disclosure.

Referring to FIG. 15, an electronic device 901 (e.g., the electronic device 801 of FIG. 14) may include a housing 910 (e.g., the housing 810), a keyboard 902 (e.g., the keyboard 602 of FIGS. 10 and 11), a palm rest 906 (e.g., the palm rest 606), a first antenna 997A (e.g., the first antenna 897A), and a second antenna 997B (e.g., the second antenna 897B).

The first antenna 997A may include a feed pattern 991 (e.g., the feed pattern 691) and a grip sensing pattern 992 (e.g., the grip sensing pattern 692). The feed pattern 991 may include a first ground area 9911 (e.g., the first ground area 6911) and a feed area 9912 (e.g., the feed area 6912). The grip sensing pattern 992 may include a second ground area 9921 (e.g., the second ground area 6921) and a coupling area 9922 (e.g., the coupling area 6922).

The coupling area 9922 may act as an isolation pattern for the first antenna 997A and the second antenna 997B. In a structure in which the first antenna 997A and the second antenna 997B are disposed adjacent to each other, the coupling area 9922 may maintain radiation performance of the first antenna 997A and/or radiation performance of the second antenna 997B.

The second antenna 997B may not include a grip sensing pattern. The second antenna 997B may share the grip sensing pattern 992 of the first antenna 997A.

A specific absorption rate (SAR) refers to the amount of electromagnetic wave energy absorbed in a unit mass of the human body (e.g., 1 kg or 1 g) per unit time. In order to achieve the SAR radio wave standard, the antenna may be driven to reduce transmission output when the human body comes into contact with the antenna. An aspect of the disclosure is to provide an antenna that provides a high-power wireless communication environment by reducing or preventing the reduction of transmission output of the antenna due to hypersensitivity to detection of contact of human body when the human body contacts the antenna, and an electronic device including the same.

According to an embodiment, an electronic device (200, 401, 501, 601) may include a housing (210, 410, 510, 610) including a first portion (A1) and a second portion (A2) different from the first portion (A1). The electronic device (200, 401, 501, 601) may include a keyboard (202, 502, 602) disposed in the first portion (A1) of the housing (210, 410, 510, 610). The electronic device (200, 401, 501, 601) may include a palm rest (206, 506, 606) disposed in the second portion (A2) of the housing (210, 410, 510, 610). The palm rest (206, 506, 606) may include a rest area (A31, A32, A33). The electronic device (200, 401, 501, 601) may include an antenna (497A, 597, 697) disposed in the housing (210, 410) to overlap the palm rest (206, 506, 606). The antenna (497A, 597, 697) may include a feed pattern (691) disposed in the rest area (A33) away from the keyboard (202, 502, 602). The feed pattern (691) may include a first ground area (6911) connected to the housing (210, 410, 510, 610). The feed pattern (691) may include a feed area (6912) connected to the first ground area (6911). The antenna (497A, 597, 697) may include a grip sensing pattern (692) disposed in the rest area (A31) adjacent to the keyboard (202, 502, 602). The grip sensing pattern (692) may include a second ground area (6921) connected to the housing (210, 410, 510, 610). The grip sensing pattern (692) may include a coupling area (6922) configured to be coupled with the feed area (6912). The coupling area (6922) may be connected to the second ground area (6921).

In an embodiment, the number of rest areas may be more than one. The plurality of rest areas (A31, A32, A33) may be arranged in a direction away from the keyboard (602). The antenna (697) may have sensitivity that decreases along the direction away from the keyboard (602).

In an embodiment, the number of rest areas may be more than one. The plurality of rest areas (A31, A32, A33) may be arranged in a direction away from the keyboard (602), and the antenna (697) may have grip sensing ranges (GA1, GA2, GA3) that decrease along the direction away from the keyboard (602).

In an embodiment, the first portion (A1) may include a first side area (A11), and a second side area (A12) opposite to the first side area (A11). The housing (410) may further include a communication module (490) disposed in the second side area (A12).

In an embodiment, the second portion (A2) may include a third side area (A21) on the same side as the first side area (A11), and a fourth side area (A22) opposite to the third side area (A21) and on the same side as the second side area (A12). The antenna (497A) may be disposed in the fourth side area (A22).

In an embodiment, at least one ground area of the first ground area (6911) and the second ground area (6921) may face a central area of the second portion (A2) and come into contact with the housing (410, 610).

In an embodiment, the feed area (6912) and the coupling area (6922) may be physically separated from each other.

In an embodiment, the electronic device (701) may include a sensor (750). The electronic device (701) may include a transmission line (C2) configured to connect the sensor (750) and the coupling area (7922).

In an embodiment, the antenna (797) may further include a connection area (7923), to which the transmission line (C2) is connected. The antenna (797) may further include an inductor (E2) configured to connect the connection area (7923) and the coupling area (7922).

In an embodiment, the transmission line (C2) may include a ground portion (C22) that comes into contact with the housing (710).

In an embodiment, the antenna (797) may further include a capacitor (E1) configured to connect the coupling area (7922) and the second ground area (7921).

In an embodiment, the palm rest (506) may include a radiating opening (5104) that at least partially overlaps the antenna (597).

In an embodiment, the electronic device (501) may further include a speaker (555) disposed between the palm rest (506) and the antenna (597).

In an embodiment, an electronic device (200, 601, 801, 901) may include a housing (210, 610, 810, 910). The housing (210, 610, 810, 910) may include a first portion (A1) and a second portion (A2) different from the first portion (A1). The electronic device (200, 601, 801, 901) may include a keyboard (202, 602, 902) disposed in the first portion (A1) of the housing (210, 610, 810, 910), and the electronic device (200, 601, 801, 901) may include a palm rest (606, 906). The palm rest (606, 906) may include a second portion (A2) of the housing (210, 610, 810, 910). The palm rest (606, 906) may include a rest area (A31, A32, A33). The electronic device (200, 601, 801, 901) may include a first antenna (697, 897A, 997A). The first antenna (697, 897A, 997A) may be configured to operate in a first frequency band. The first antenna (697, 897A, 997A) may be disposed in the housing to overlap the palm rest (606, 906). The first antenna (697, 897A, 997A) may include a feed pattern (691, 991). The feed pattern (691, 991) may be disposed in the rest area (A33) away from the keyboard (602, 902). The feed pattern (691, 991) may include a first ground area (6911, 9911) connected to the housing (610, 910). The feed pattern (691, 991) may include a feed area (6912, 9912) connected to the first ground area (6911, 9911). The first antenna (697, 897A, 997A) may include a grip sensing pattern (992) disposed in the rest area (A31) adjacent to the keyboard (602, 902). The grip sensing pattern (992) may include a second ground area (6921, 9921) connected to the housing (610, 910). The grip sensing pattern (992) may include a coupling area (6922, 9922) configured to be coupled to the feed area (6912, 9912). The coupling area (6922, 9922) may be connected to the second ground area (6921, 9921). The electronic device (200, 601, 801, 901) may include a second antenna (897B, 997B). The second antenna (897B, 997B) may be configured to operate in a second frequency band different from the first frequency band. The second antenna (897B, 997B) may be disposed in the housing (910) to be coupled with the grip sensing pattern (992).

In an embodiment, the second antenna (997B) and the coupling area (9922) are physically separated from each other.

In an embodiment, the second antenna (897B, 997B) may be configured to transmit a signal in the second frequency band while the first antenna (897A, 997A) transmits a signal in the first frequency band.

In an embodiment, the first portion (A1) may include a first side area (A11), and a second side area (A12) opposite to the first side area (A11). The housing (810) may further include a communication module (890) disposed in the second side area (A12).

In an embodiment, the second portion (A2) may include a third side area (A21) on the same side as the first side area (A11), and a fourth side area (A22) opposite to the third side area (A21) and on the same side as the second side area (A12). The first antenna (897A) and the second antenna (897B) may be disposed in the fourth side area (A22).

In an embodiment, the second antenna (897B) may be disposed between the communication module (890) and the first antenna (897A).

In an embodiment, the antenna (697A, 997A) may include a feed pattern (691, 991). The feed pattern (691, 991) may include a first ground area (6911, 9911). The feed pattern (691, 991) may include a feed area (6912, 9912) connected to the first ground area (6911, 9911). The antenna (697A, 997A) may include a grip sensing pattern (692, 992). The grip sensing pattern (692, 992) may include a second ground area (6921, 9921). The grip sensing pattern (692, 992) may include a coupling area (6922, 9922) configured to be coupled to the feed area (6912, 9912). The coupling area (6922, 9922) may be connected to the second ground area (6921).

According to an embodiment, in typical usage scenarios of electronic devices (e.g., keyboard typing situations), the transmission performance of the antenna may be improved by substantially not causing the reduction of the transmission output of the antenna due to hypersensitivity to detection of the contact of the human body. According to an embodiment, the sensitivity to detection of contact of human body may be distributed while satisfying the SAR standard. For example, the sensitivity of another area (e.g., a lower area) of an antenna may be lower than the sensitivity of an area (e.g., an upper area) of the antenna. The effects of the antenna and the electronic device including the same according to an embodiment may not be limited to the above-mentioned effects, and other unmentioned effects may be clearly understood from the following description by one of ordinary skill in the art.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing comprising a first portion and a second portion different from the first portion;

a keyboard disposed in the first portion of the housing;

a palm rest disposed in the second portion of the housing and comprising a rest area; and an antenna disposed in the housing to overlap the palm rest, wherein the antenna comprises:

a feed pattern disposed in the rest area away from the keyboard, the feed pattern comprising a first ground area connected to the housing, and a feed area connected to the first ground area, and a grip sensing pattern disposed in the rest area adjacent to the keyboard, the grip sensing pattern comprising a second ground area connected to the housing, and a coupling area connected to the second ground area and configured to be coupled to the feed area.

2. The electronic device of claim 1, wherein a number of rest areas is more than one, a plurality of the rest areas is arranged in a direction away from the keyboard, and the antenna has sensitivity that decreases along the direction away from the keyboard.

3. The electronic device of claim 1, wherein a number of rest areas is more than one, a plurality of the rest areas are arranged in a direction away from the keyboard, and the antenna has grip sensing ranges that decrease along the direction away from the keyboard.

4. The electronic device of claim 1, wherein the first portion comprises a first side area, and a second side area opposite to the first side area, and the housing further comprises a communication module disposed in the second side area, and wherein the second portion comprises a third side area on a same side as the first side area, and a fourth side area opposite to the third side area and on the same side as the second side area, and the antenna is disposed in the fourth side area.

5. The electronic device of claim 1, wherein at least one ground area of the first ground area and the second ground area faces a central area of the second portion and comes into contact with the housing.

6. The electronic device of claim 1, wherein the feed area and the coupling area are physically separated from each other.

7. The electronic device of claim 1, further comprising:

a sensor; and a transmission line configured to connect the sensor and the coupling area, wherein the antenna further comprises a connection area, to which the transmission line is connected, and an inductor configured to connect the connection area and the coupling area, and/or wherein the transmission line comprises a ground portion that comes into contact with the housing.

8. The electronic device of claim 1, wherein the antenna further comprises a capacitor configured to connect the coupling area and the second ground area.

9. The electronic device of claim 1, wherein the palm rest comprises a radiating opening that at least partially overlaps the antenna.

10. The electronic device of claim 1, further comprising a speaker disposed between the palm rest and the antenna.

11. The electronic device of claim 1, further comprising a cooling module configured to reduce heat from at least one portion of the electronic device.

12. The electronic device of claim 1, further comprising a heat plate configured to absorb heat from at least one portion of the electronic device.

13. The electronic device of claim 1, wherein the antenna is a first antenna configured to operate in a first frequency band, and wherein the electronic device further comprises a second antenna configured to operate in a second frequency band different from the first frequency band, and disposed in the housing to be coupled with the grip sensing pattern.

14. The electronic device of claim 13, wherein the second antenna and the coupling area are physically separated from each other.

15. The electronic device of claim 13, wherein the second antenna is configured to transmit a signal in the second frequency band while the first antenna transmits a signal in the first frequency band.

16. The electronic device of claim 13, wherein the first portion comprises a first side area, and a second side area opposite to the first side area, and the housing further comprises a communication module disposed in the second side area, wherein the second portion comprises a third side area on a same side as the first side area, and a fourth side area opposite to the third side area and on the same side as the second side area, and the first antenna and the second antenna are disposed in the fourth side area, and/or wherein the second antenna is disposed between the communication module and the first antenna.

17. An antenna for an electronic device of claim 1 comprising a second antenna configured to operate in a second frequency band different from a first frequency band of a first antenna.

* * * * *